United States Patent
Hung

(10) Patent No.: US 10,976,001 B2
(45) Date of Patent: Apr. 13, 2021

(54) SUPPORT ARM DEVICE

(71) Applicant: MODERNSOLID INDUSTRIAL CO., LTD., Taichung (TW)

(72) Inventor: Chin-Jui Hung, Taichung (TW)

(73) Assignee: MODERNSOLID INDUSTRIAL CO., LTD., Taichung (TW)

(*) Notice: Subject to any disclaimer, the term of this patent is extended or adjusted under 35 U.S.C. 154(b) by 5 days.

(21) Appl. No.: 16/526,918

(22) Filed: Jul. 30, 2019

(65) Prior Publication Data

US 2020/0063910 A1 Feb. 27, 2020

(30) Foreign Application Priority Data

Aug. 21, 2018 (TW) .................................. 107129166

(51) Int. Cl.
| | | |
|---|---|---|
| *F16M 1/00* | (2006.01) | |
| *F16M 11/10* | (2006.01) | |
| *F16M 11/20* | (2006.01) | |

(52) U.S. Cl.
CPC ......... *F16M 11/10* (2013.01); *F16M 11/2014* (2013.01); *F16M 11/2021* (2013.01); *F16M 2200/065* (2013.01)

(58) Field of Classification Search
CPC ................................ F16M 11/10; F16M 11/06
USPC ..... 248/276.1, 284.1, 291.1, 292.11, 292.12, 248/292.13, 292.14, 123.11, 123.2, 917, 248/919, 920, 921, 922, 923
See application file for complete search history.

(56) References Cited

U.S. PATENT DOCUMENTS

| | | | | |
|---|---|---|---|---|
| 5,743,503 | A * | 4/1998 | Voeller ................... | F16M 11/08 248/284.1 |
| 6,012,693 | A * | 1/2000 | Voeller ................. | F16M 11/048 248/279.1 |
| 8,777,172 | B2 * | 7/2014 | Sapper ................... | F16M 11/08 248/274.1 |
| 8,960,632 | B2 * | 2/2015 | Fallows ............. | F16M 11/2092 248/575 |
| 9,657,889 | B1 * | 5/2017 | Chumakov ........ | F16M 11/2014 |

(Continued)

FOREIGN PATENT DOCUMENTS

| | | |
|---|---|---|
| CN | 206831077 U | 1/2018 |
| TW | M368005 U | 11/2009 |
| TW | M572295 U | 1/2019 |

OTHER PUBLICATIONS

Search Report appended to an Office Action, which was issued to Taiwanese counterpart application No. 107129166 by the TIPO dated May 24, 2019, with an English translation thereof.

*Primary Examiner* — Steven M Marsh
(74) *Attorney, Agent, or Firm* — DLA Piper LLP (US)

(57) ABSTRACT

A support arm device includes a joint unit, an arm unit, and an outer shell. The joint unit includes two spaced-apart joint seats. Each joint seat has two curved joining members that are opposite to each other. The arm unit is pivotally connected between the joint seats. The outer shell is flexible, and includes two side walls disposed respectively at opposite lateral sides of the joint seats, and a top wall interconnecting top ends of the side walls. Each side wall has a first docking portion engaging concentrically and rotatably a respective one of the joint members of one of the joint seats, and a second docking portion engaging concentrically and rotatably a respective one of the joint members of the other one of the joint seats.

11 Claims, 9 Drawing Sheets

(56) References Cited

U.S. PATENT DOCUMENTS 9,752,723 B2 * 9/2017 Hung ................. F16M 13/02
10,738,940 B2 * 8/2020 Hung .................. F16M 13/022

* cited by examiner

SUPPORT ARM DEVICE

CROSS-REFERENCE TO RELATED APPLICATION

This application claims priority of Taiwanese Patent Application No. 107129166, filed on Aug. 21, 2018.

FIELD

The disclosure relates to a support arm device, more particularly to a support arm device with an outer shell.

BACKGROUND

Referring to FIGS. 1 and 2, a conventional support arm device 9 is adapted to suspend an object, such as a display. The conventional support arm device 9 includes two arm members 91, an endcap member 92, a connecting member 93, an extension and retraction mechanism 94 disposed in between the arm members 91, and two cover plates 95 (only one is visible in FIG. 1) flanking the arm members 91 and covering a gap between the two arm members 91. The arm members 91 are pivotally connected to the endcap member 92 and the connecting member 93, forming a four-bar linkage. Two ends of each of the cover plates 95 are respectively and pivotally connected to the endcap member 92 and the connecting member 93 along with the arm members 91. The cover plates 95 shield the extension and retraction mechanism 94 and improve the aesthetic of the conventional support arm device 9.

The conventional support arm device 9 uses the arm members 91 to support the object, and the extension and retraction mechanism 94 to carry the load of the object so that the object may be fixed at a desired position.

The cover plates 95 are disposed in the arm members 91 and abut against inner surfaces of the arm members 91, thus it is difficult to align the cover plates 95 with the arm members 91 when assembling the conventional support arm device 9. Further, the cover plates 95 do not cover the intersections of the arm members 91, the endcap member 92 and the connecting member 93.

SUMMARY

Therefore, the object of the disclosure is to provide a support arm device that can alleviate at least one of the drawbacks of the prior art.

According to the disclosure, a support arm device includes a joint unit, an arm unit, and an outer shell.

The joint unit includes two spaced-apart joint seats. Each of the joint seats has two curved joining members that are opposite to each other.

The arm unit is pivotally connected between the joint seats.

The outer shell is flexible and includes two spaced-apart side walls that are disposed respectively at opposite lateral sides of the joint seats and the arm unit, and a top wall that interconnects top ends of the side walls. Each of the side walls has a first docking portion that engages concentrically and rotatably a respective one of the joint members of one of the joint seats, and a second docking portion that engages concentrically and rotatably a respective one of the joint members of the other one of the joint seats.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
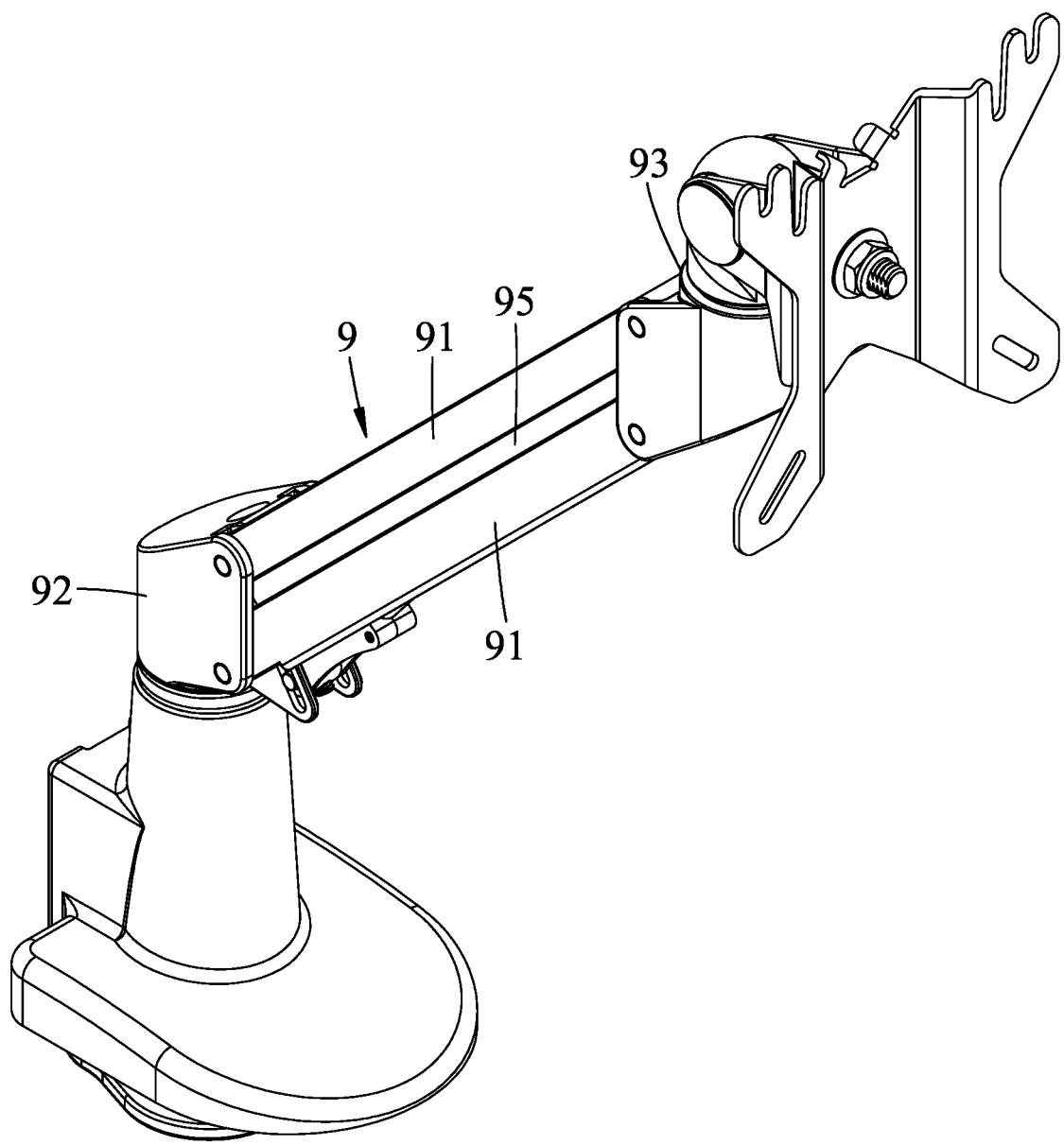
FIG. 1 is a perspective view of a conventional support arm device.
Figure 2:
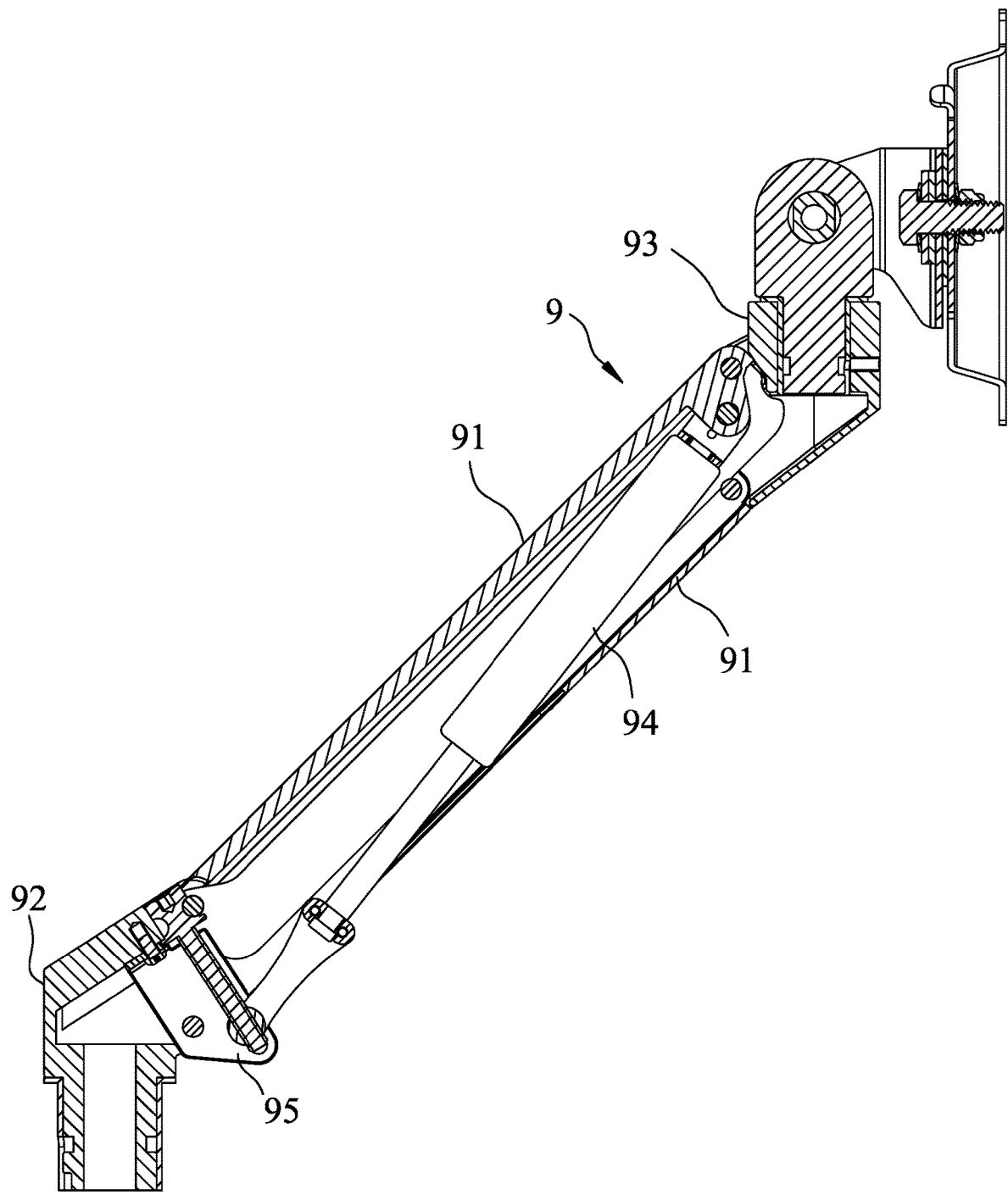
FIG. 2 is a sectional view of the conventional support arm device.
Figure 3:
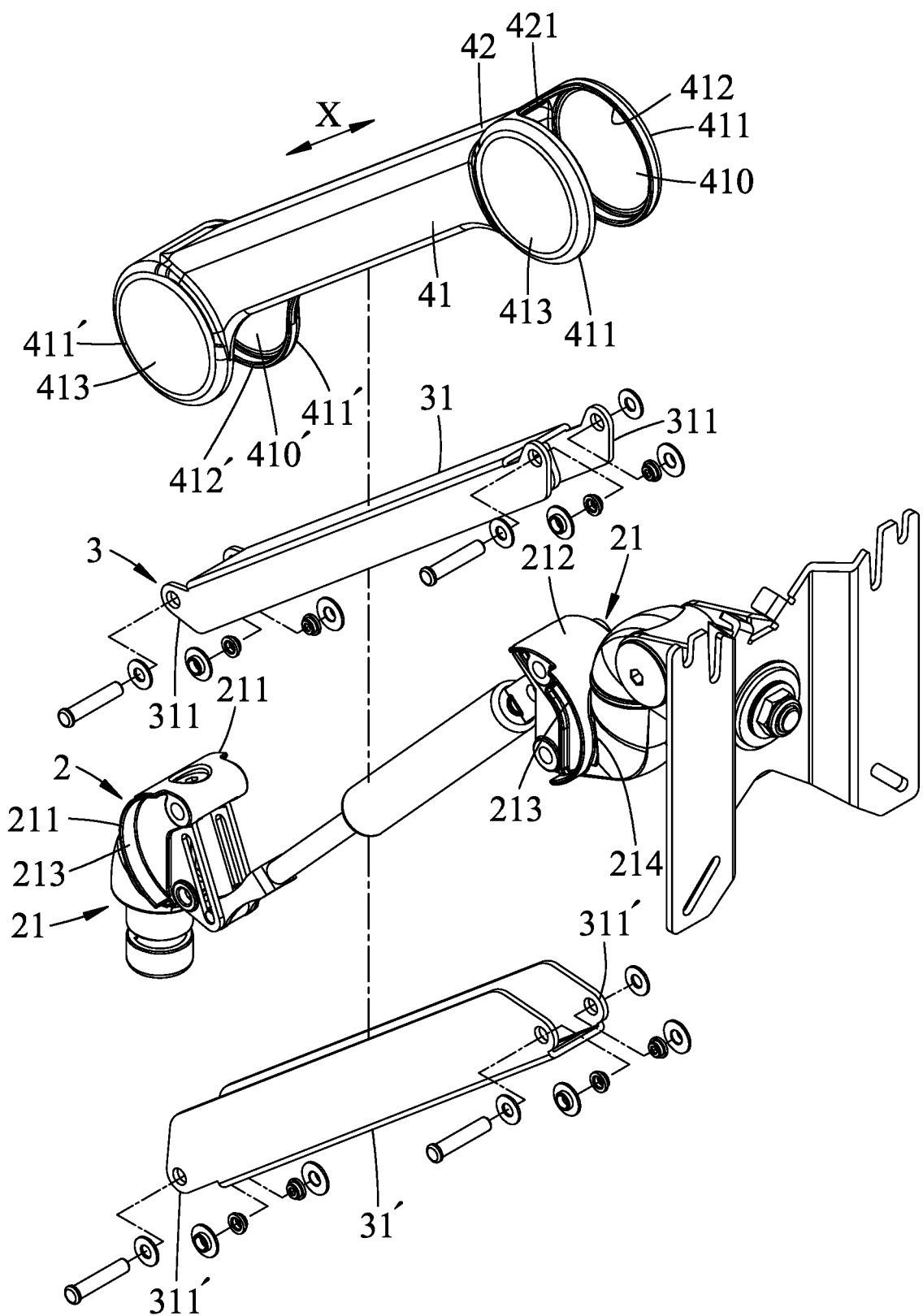
FIG. 3 is an exploded perspective view of an embodiment of a support arm device according to the disclosure.
Figure 4:
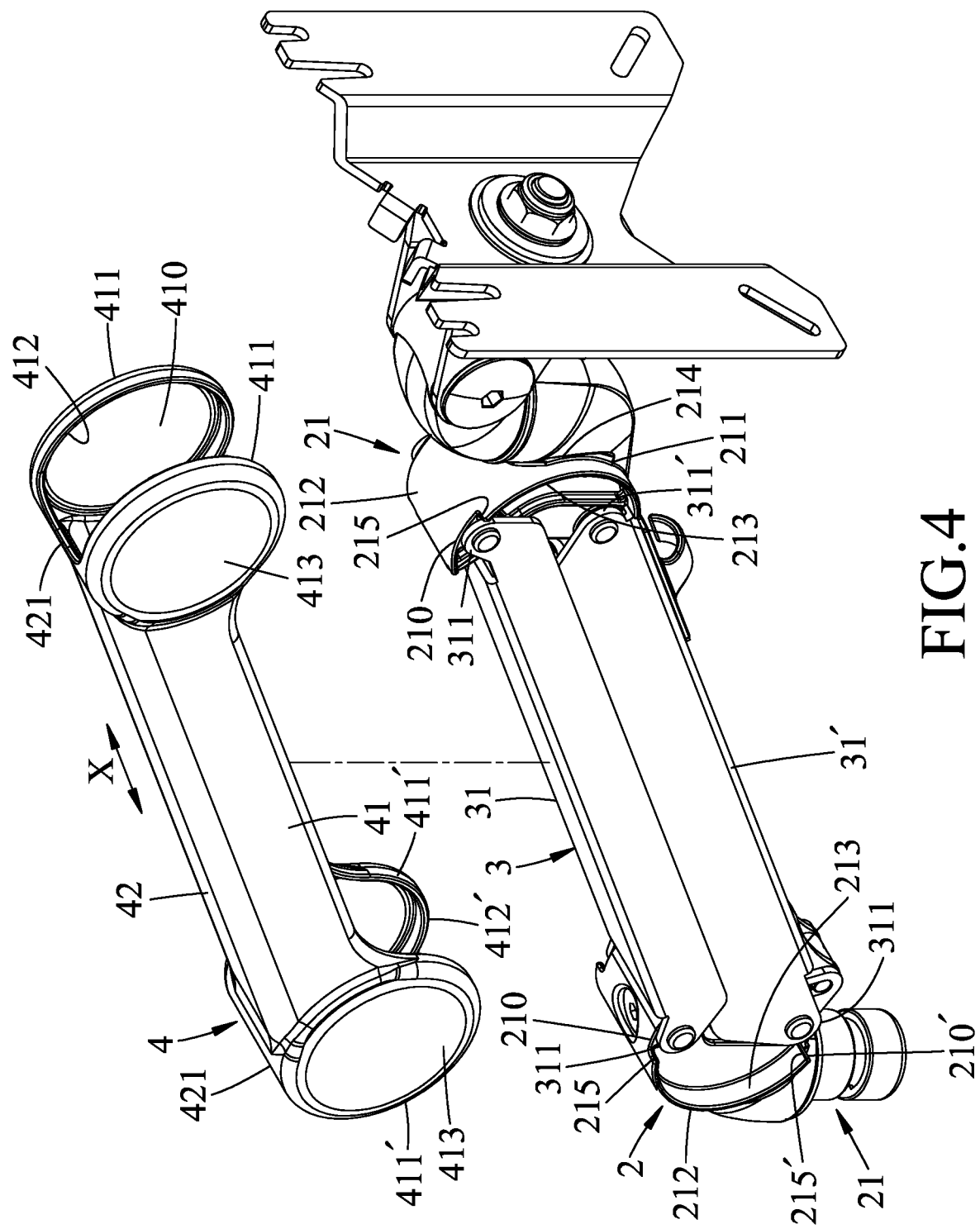
FIG. 4 is a partly exploded perspective view of the embodiment.
Figure 5:
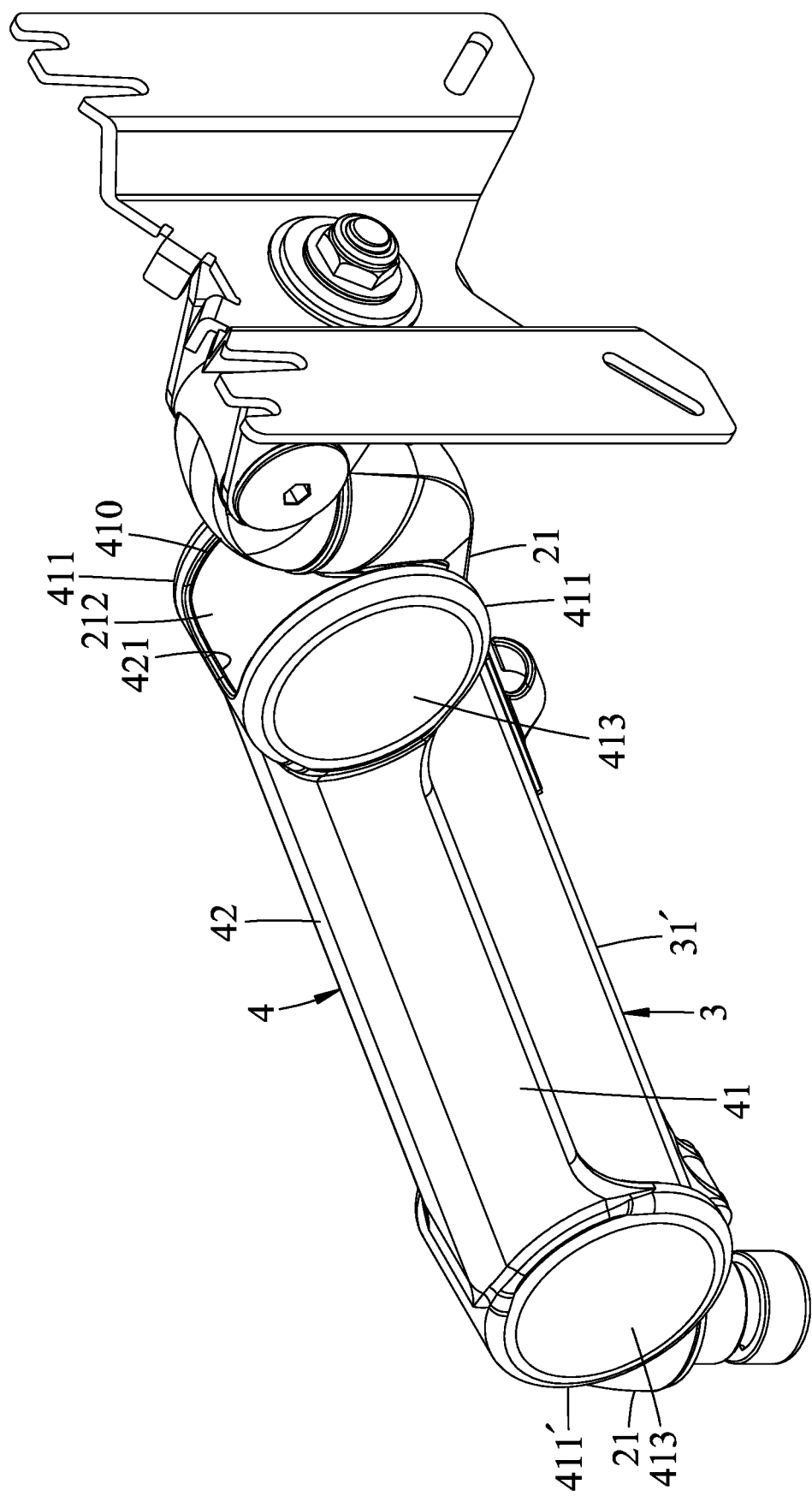
FIG. 5 is an assembled perspective view of the embodiment.
Figure 6:
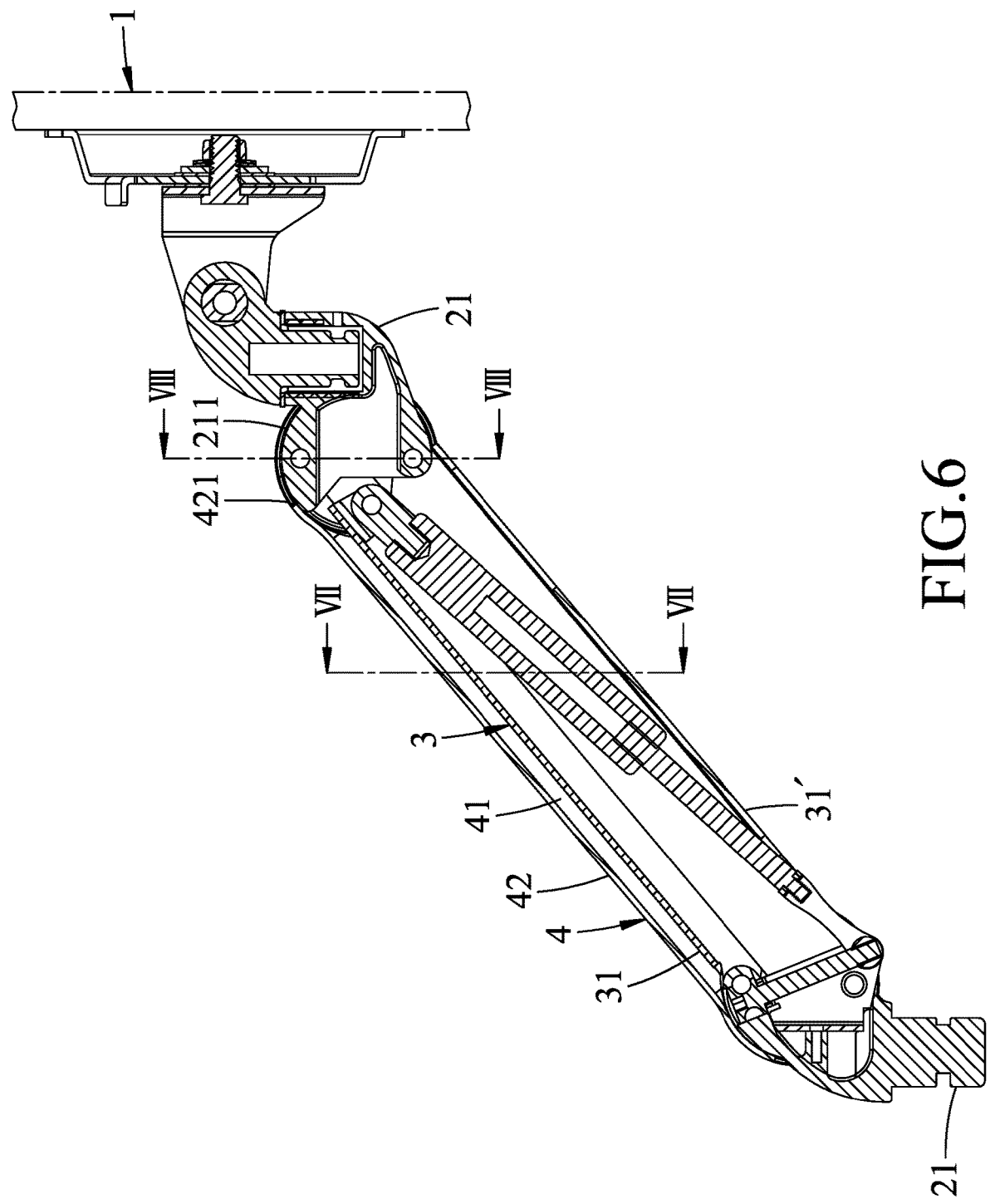
FIG. 6 is a sectional view of the embodiment.
Figure 7:
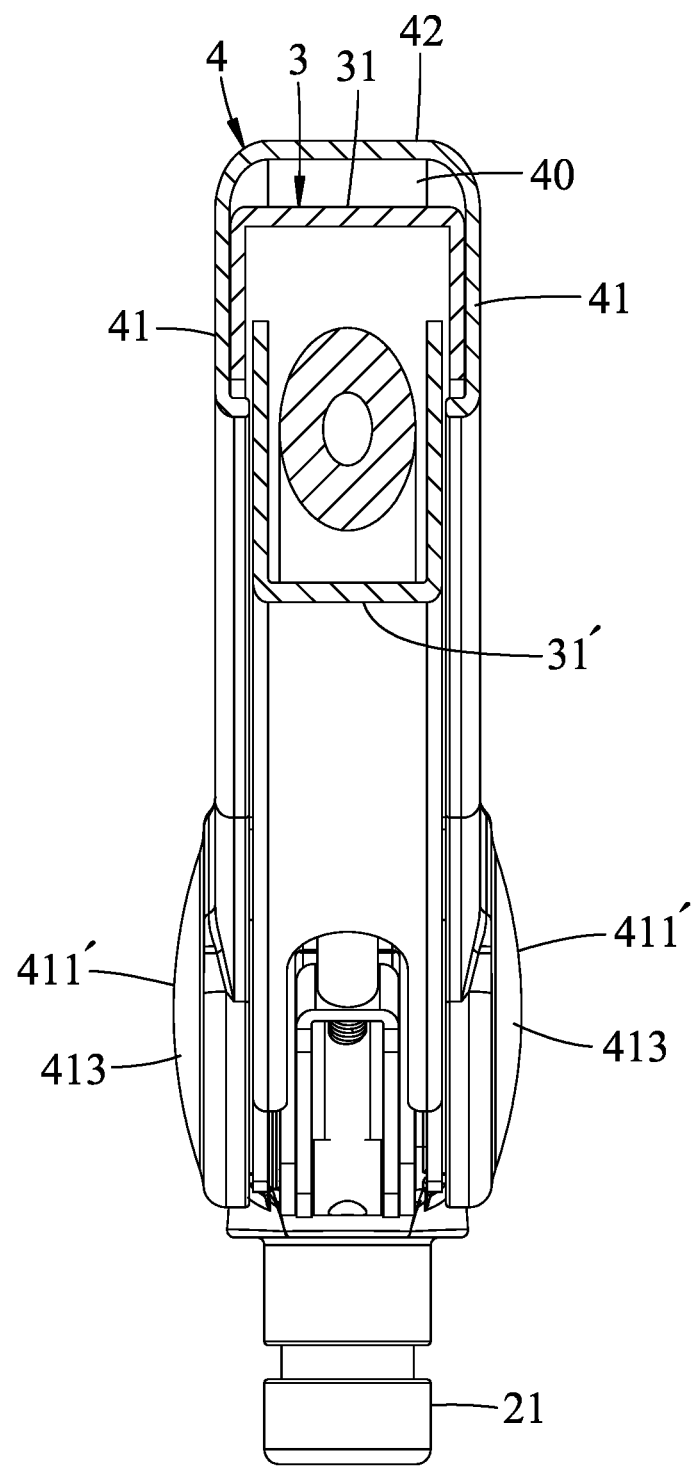
FIG. 7 is a sectional view taken along line VII-VII in FIG. 6.
Figure 8:
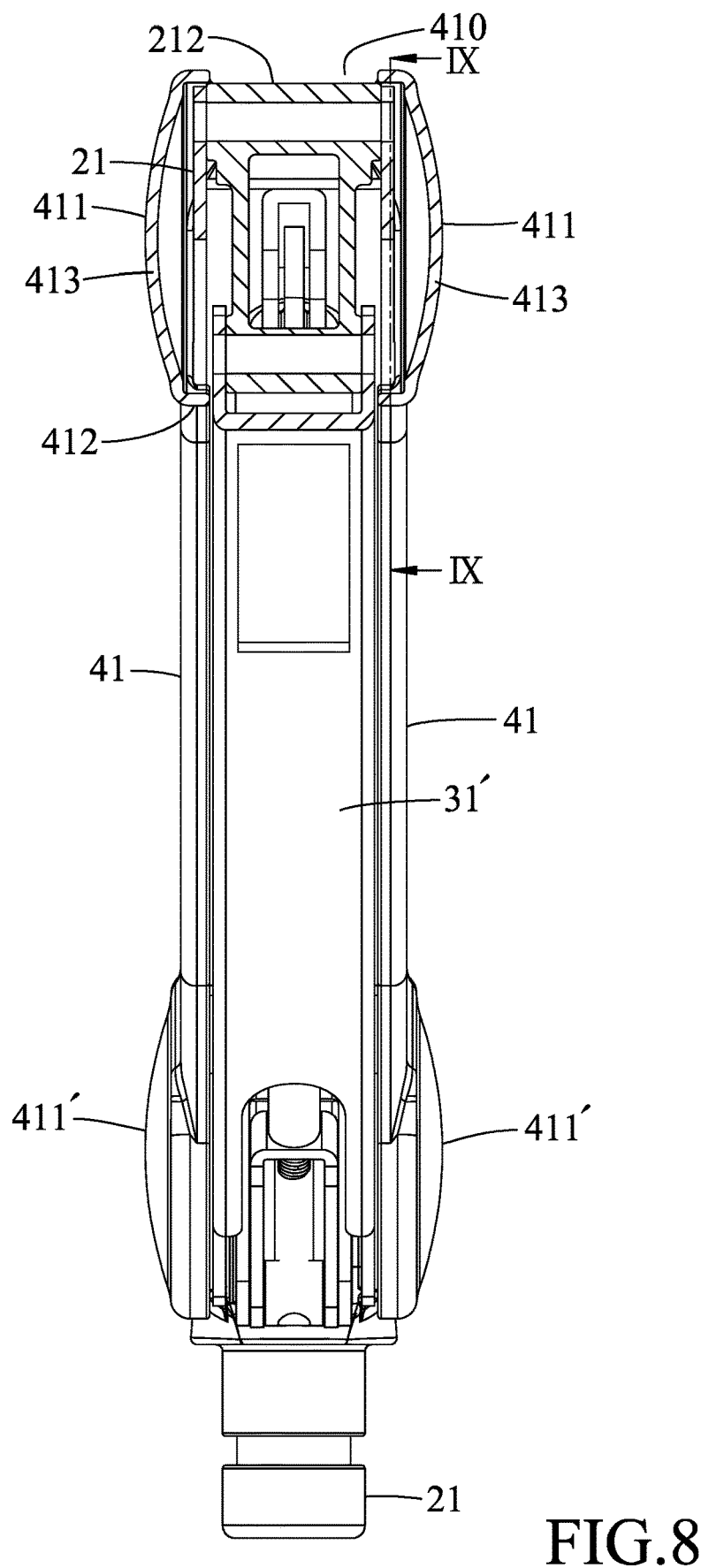
FIG. 8 is a sectional view taken along line VIII-VIII in FIG. 6.

Referring to FIGS. 3, 4, and 5, an embodiment of a support arm device according to the disclosure is adapted for supporting an object 1 (e.g. a screen, as shown in FIG. 6) and includes a joint unit 2, an arm unit 3, and an outer shell 4.

Figure 9:
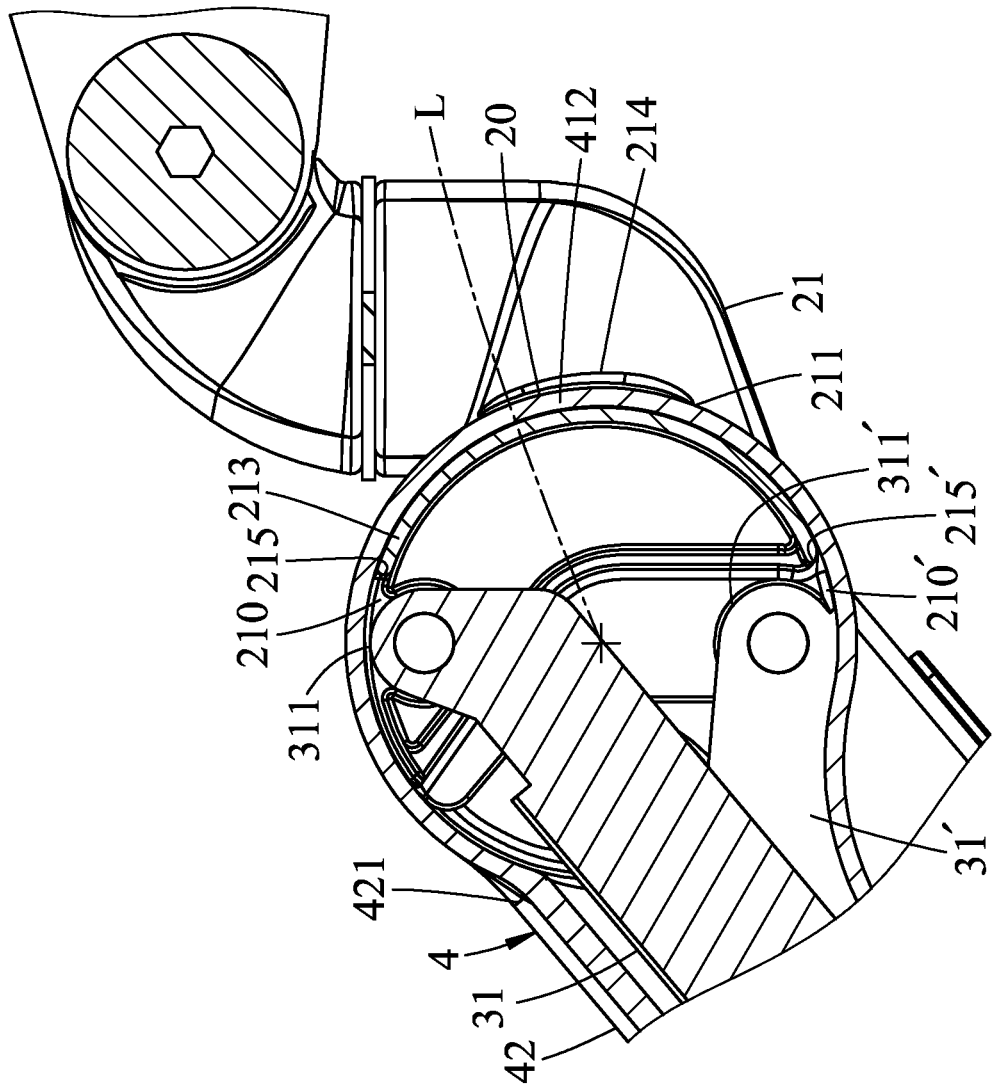
FIG. 9 is a fragmentary sectional view taken along line IX-IX in FIG. 8.

Referring further to FIG. 9, the joint unit 2 includes two spaced-apart joint seats 21. Each of the joint seats 21 has two curved joining members 211 that are opposite to each other, and a curved member 212 distal from the arm unit 3 and having opposite lateral ends that are respectively connected to the joining members 211. Each of the joining members 211 has a first curved segment 213 and a second curved segment 214 being concentric with the first curved segment 213. The first and second curved segments 213, 214 cooperatively define a curved groove 20. A radian of the first curved segment 213 is larger than that of the second curved segment 214. The radian of the first curved segment 213 ranges between $\pi/3$ and $\pi$. In this embodiment, the radian of the first curved segment 213 is $\pi/3$. For each of the joint seats 21, the first curved segment 213 of each of the joining members 211 has an upper edge 215 cooperating with the curved member 212 to define an upper gap 210, and a lower edge 215' circumferentially opposite to the upper edge 215 and cooperating with the curved member 212 to define a lower gap 210'.

Referring to FIGS. 3, 4, and 6, the arm unit 3 is pivotally connected between the joint seats 21 and includes upper and lower support arms 31, 31'. Each of the upper and lower support arms 31, 31' has opposite arm ends 311, 311' that are respectively and pivotally connected to the joint seats 21, such that the upper and lower support arms 31, 31' and the joint seats 21 cooperatively form a four-bar linkage. One of the arm ends 311 of the upper support arm 31 extends into the upper gaps 210 of one of the joint seats 21, and the other one of the arm ends 311 of the upper support arm 31 extends into the upper gaps 210 of the other one of the joint seats 21. One of the arm ends 311' of the lower support arm 31' extends into the lower gaps 210' of one of the joint seats 21, and the other one of the arm ends 311' of the lower support arm 31' extends into the lower gaps 210' of the other one of the joint seats 21.

Referring to FIGS. 4, 5, 8, and 9, the outer shell 4 is flexible, extends along a lengthwise direction (X), and includes two spaced-apart side walls 41 that are disposed respectively at opposite lateral sides of the joint seats 21 and the arm unit 3, and a top wall 42 that interconnects top ends of the side walls 41. The side walls 41 and the top wall 42 cooperatively define a channel 40. Each of the side walls 41 of the outer shell 4 covers at least a portion of the upper support arm 31 and at least a portion of the lower support arm 31', and has a first docking portion 412 and a second docking portion 412'.

The first docking portion 412 of each of the side walls 41 is annular and engages concentrically and rotatably the curved groove 20 of a respective one of the joining members 211 of the one of the joint seats 21. Likewise, the second docking portion 412' of each of the side walls 41 is annular and engages concentrically and rotatably the curved groove 20 of a respective one of the joining members 211 of the other one of the joint seats 21.

In this embodiment, each of the side walls 41 of the outer shell 4 further has first and second ear end sections 411, 411' that are arranged in the lengthwise direction (X) and that respectively have the first and second docking portions 412, 412'. The first ear end sections 411 of the side walls 41 cover respectively opposite lateral sides of one of the joint seats 21. The second ear end sections 411' of the side walls 41 cover respectively opposite lateral sides of the other one of the joint seats 21. Each of the first and second ear end sections 411, 411' further has a circular wall 413 spaced apart from a respective one of the joint seats 21.

The top wall 42 has two edges 421 spaced apart in the lengthwise direction (X). One of the edges 421 of the top wall 42 cooperates with the first docking portions 412 of the side walls 41 to define a first curved opening 410 that is in communication with the channel 40 and that exposes the one of the joint seats 21. The other one of the edges 421 of the top wall 42 cooperates with the second docking portions 412' of the side walls 41 to define a second curved opening 410' that is in communication with the channel 40 and that exposes the other one of the joint seats 21.

In this embodiment, the outer shell 4 is made of a plastic material that is flexible. It should be noted that the material of the outer shell 4 is not limited to being plastic, and may be any material that is flexible, e.g. metal.

In order to install the outer shell 4, one only needs to align the channel 40 with the arm unit 3 and the joint unit 2, and press the outer shell 4 against the arm unit 3 and the joint unit 2. Since the outer shell 4 is flexible, the side walls 41 thereof would be pushed outwards by the arm unit 3 and the joint unit 2 such that the arm unit 3 and the joint unit 2 can be inserted into the channel 40. In this embodiment, the side walls 41 cover the upper support arm 31 and a portion of the lower support arm 31'.

After installation, the first and second docking portions 412, 412' of the side walls 42 rotatably surrounds the corresponding first curved segments 213 and are engaged rotatably with the corresponding curved grooves 20. When an angle between the arm unit 3 and the joint unit 2 is changed, an angle between the first and second docking portions 412, 412' and the respective one of the joining member 211 is consequently changed such that the outer shell 4 may stay at a fixed position relative to the arm unit 3. Since the arm ends 311, 311' of the upper and lower support arms 31, 31' extend into the corresponding upper and lower gaps 210, 210' of the joint seats 21, and since the joint seats 21 are disposed in the first and second curved openings 410, 410' of the outer shell 4, the arm unit 3, the joint seats 21, and the outer shell 4 do not interfere with each other. Thus, the angle between the arm unit 3 and the joint unit 2 may be changed smoothly.

In sum, the advantages of the embodiment are as follows:

1. By making the outer shell 4 out of a flexible material, the structure of the outer shell 4 as well as the installation of the outer shell 4 may be simplified.

2. By the rotatable engagement between the first and second docking portions 412, 412' and the corresponding joining members 211, when the angle between the arm unit 3 and the joint unit 2 is being changed, the angle between the first and second docking portions 412, 412' and the joining members 211 may also change in such a way that the outer shell 4 stays in a fixed position relative to the arm unit 3.

3. Not only can the outer shell 4 shield the gap between the upper and lower support arms 31, 31', the outer shell 4 also shields the lateral sides of the joint seats 21, improving the aesthetic of the support arm device.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A support arm device comprising:
   a joint unit including two spaced-apart joint seats, each of said joint seats having two curved joining members that are opposite to each other;
   an arm unit pivotally connected between said joint seats; and
   an outer shell being flexible and including
   two spaced-apart side walls that are disposed respectively at opposite lateral sides of said joint seats and said arm unit, each of said side walls having a first docking portion that engages concentrically and rotatably a respective one of said joint members of one of said joint seats, and a second docking portion that engages concentrically and rotatably a respective one of said joint members of the other one of said joint seats, and
   a top wall that interconnects top ends of said side walls.

2. The support arm device as claimed in claim 1, wherein:
   each of said joining members has a first curved segment and a second curved segment being concentric with said first curved segment, said first and second curved segments cooperatively defining a curved groove;

said first docking portion of each of said side walls engages rotatably said curved groove of the respective one of said joint members of the one of said joint seats; and said second docking portion of each of said side walls engages rotatably said curved groove of the respective one of said joint members of the other one of said joint seats.

3. The support arm device as claimed in claim 2, wherein a radian of said first curved segment is larger than that of said second curved segment.

4. The support arm device as claimed in claim 3, wherein the radian of said first curved segment ranges between $\pi/3$ and $\pi$.

5. The support arm device as claimed in claim 3, wherein:
each of said joint seats further includes a curved member distal from said arm unit and having opposite lateral ends that are respectively connected to said joint members;
for each of said joint seats, said first curved segment of each of said joining members has an upper edge cooperating with said curved member to define an upper gap, and a lower edge circumferentially opposite to said upper edge and cooperating with said curved member to define a lower gap.

6. The support arm device as claimed in claim 5, wherein:
said arm unit includes upper and lower support arms, each of said upper and lower support arms having opposite arm ends that are respectively and pivotally connected to said joint seats;
one of said arm ends of said upper support arm extends into said upper gaps of one of said joint seats, and the other one of said arm ends of said upper support arm extends into said upper gaps of the other one of said joint seats;
one of said arm ends of said lower support arm extends into said lower gaps of one of said joint seats, and the other one of said arm ends of said lower support arm extends into said lower gaps of the other one of said joint seats; and
each of said side walls of said outer shell covers at least a portion of said upper support arm and at least a portion of said lower support arm.

7. The support arm device as claimed in claim 1, wherein:
each of said side walls of said outer shell further has first and second ear end sections having respectively said first and second docking portions;
said first ear end sections of said side walls cover respectively opposite lateral sides of one of said joint seats; and
said second ear end sections of said side walls cover respectively opposite lateral sides of the other one of said joint seats.

8. The support arm device as claimed in claim 7, wherein each of said first and second ear end sections further has a circular wall spaced apart from a respective one of said joint seats.

9. The support arm device as claimed in claim 7, wherein said outer shell is made of a plastic material.

10. The support arm device as claimed in claim 7, wherein
said side walls and said top wall of said outer shell cooperatively define a channel;
said first and second ear end sections of each of said side walls are arranged in a lengthwise direction;
said top wall has two edges spaced apart in the lengthwise direction;
one of said edges of said top wall cooperates with said first docking portions of said side walls to define a first curved opening that is in communication with said channel and that exposes the one of said joint seats; and
the other one of said edges of said top wall cooperates with said second docking portions of said side walls to define a second curved opening that is in communication with said channel and that exposes the other one of said joint seats.

11. A support arm device comprising:
a joint unit including two spaced-apart joint seats, each of said joint seats having two curved joining members that are opposite to each other;
an arm unit pivotally connected between said joint seats; and
an outer shell being flexible and including
two spaced-apart side walls that are disposed respectively at opposite lateral sides of said joint seats and said arm unit, each of said side walls having a first docking portion that engages concentrically and rotatably a respective one of said joint members of one of said joint seats, and a second docking portion that engages concentrically and rotatably a respective one of said joint members of the other one of said joint seats, and
a top wall that interconnects top ends of said side walls;
wherein each of said joining members has a first curved segment and a second curved segment being concentric with said first curved segment, said first and second curved segments cooperatively defining a curved groove;
wherein said first docking portion of each of said side walls engages rotatably said curved groove of the respective one of said joint members of the one of said joint seats; and
wherein said second docking portion of each of said side walls engages rotatably said curved groove of the respective one of said joint members of the other one of said joint seats.

* * * * *